Patented Aug. 1, 1939

2,168,304

UNITED STATES PATENT OFFICE 2,168,304

COMPOSITION FOR PRESERVING FLOWERS

August A. Meyer, River Forest, Ill.

No Drawing. Application July 5, 1938,
Serial No. 217,587

11 Claims. (Cl. 71—2)

This invention relates to a composition of materials adapted to be added to the water in which cut flowers are immersed in the home or similar places where cut flowers are placed, the composition being composed of certain chemicals which result in and perform certain desirable and important functions when added to the water and which also have certain desirable reactions with sugar or similar soluble flower food when added to the body of water simultaneously with such chemicals.

It is well known that when cut flowers, especially roses, are inserted into water in the home, set in warm temperatures or drafts, their normal life, that is, the period during which they remain in bloom, is usually from about two to four days; further, that when the cut flowers have been inserted in water for about two days, even in relatively favorable temperatures, the petals begin to shrivel and drop off because of oxidation by the outside air and because the fibrous structure of the individual stem portions of the petals decay and decompose to such an extent that the slightest air current will cause the petals to wilt, which wilting and decay is also due to too rapid absorption of the moisture within the petals and stems by the surrounding air, and the inadequate ability of the stems to absorb enough water for the head of the flower.

It is further well known that the body of water into which cut flowers are inserted begins to get "sour" because of the chemical changes created and caused by the flowers' stems, and unless the water is changed almost daily, the oxidation increases to the point where the stem is unable to absorb enough water to fully develop the bloom, and because of the action of the active bacteria in the body of water and such action and growth of bacteria continually increases the longer the water is allowed to stand. It is also well known that the souring action of the water substantially clogs the pores in the stems through which the flower head draws water and that the ends of the stems in the water begin to decay, both of these factors resulting in a substantial cessation of the development of the flower, of the "feeding" of the flower, and resulting in the oxidation and decay of the fibrous structure connecting the petals to the stems with subsequent wilting and dropping off of the flower petals. These undesirable factors are even greater in relatively hot and dry room temperatures. Various attempts have been made to overcome these undesirable actions, as, for example, by clipping the stems from day to day, by changing the water at frequent intervals and by placing flowers in a cold room, but this has been successful only to a very small degree, it being well known that such practice seldom lengthens the normal life of the cut flower more than a day or two, and further, that it is impossible to maintain cool temperatures in the average room of a dwelling.

Unsuccessful attempts have been made to create conditions in the body of water which are similar to conditions to which the flower has been accustomed in the soil in which it has been growing, but the oxidation with the surrounding air, the relatively warm room temperatures and the failure to provide a properly balanced food and properly balanced sterilizing and astringent ingredients has prevented satisfactory solution. My invention has for its purpose the elimination of these undesirable factors and the creation of conditions and combined chemical and food ingredients within the body of water which will cause the cut flowers to continue to develop, to prevent oxidation; to withstand relatively high room temperatures and to remain in the same desirable normal condition as when cut for periods of time ranging from four to ten days.

Important objects of my invention are:

To provide an inexpensive composition of chemicals which cooperate with each other and which are adapted to be added to and dissolved in water into which cut flowers are inserted, together with the simultaneous addition of a soluble plant food such as sugar, the resulting solution being substantially sterilized by the chemical ingredients to keep the water clean and prevent its "souring", said composition containing ingredients which give it the properties of hardening and strengthening the fibrous structure of the stems and the petals of the flower, preventing contraction and keep the open end of the stem free from clogging and allowing the stem to feed the flower, stimulating the development of the flower or bud and enriching its color and "feeding" the flower to also materially lengthen its life as a firm and normal cut flower.

To provide a liquid composition which is applied for the first time to its active uses at the time the cut flowers are to be placed therein in the home under any of a variety of normally unfavorable conditions such as hot or dry temperatures, or draft.

To provide an inexpensive soluble composition composed of co-acting ingredients which is adapted to be added to water for cut flowers simultaneous with sugar or the like and which will initiate chemical reactions in the solution to create a stimulating "quick food" in addition to causing its relatively rapid absorption by the flower, in addition to the formation and gradual assimilation of a normal flower food, as, for example, sugar, said "quick food", as a stimulant, being absorbed relatively quickly by the immersed flower to cause the flower to have a richer or deeper color and to strengthen its fibrous structure and substantially delay the formation of the decayed area about the stem of the individual petals of the flower, and no change of water is required during the life of the flower.

To provide conditions and ingredients capable of assimilation by the flower in the solution, in which solution the flowers are inserted, which are practically the same as or equivalent to those which were present in the soil in which the flower originally grew.

To provide a water soluble composition of co-acting materials adapted to be added in predetermined proportions to water to be used for flowers which will liberate a desirable amount of sterilizing gases in the water to sterilize the water solution by killing bacteria therein and thereby preventing the water from turning sour, and which acts as an astringent to maintain free the openings of the stem from which the leaves and petals absorb moisture and food, and which also acts as a "carrier" of the water through the structure of the stem and flower petals.

Other and further objects of the invention will be apparent from the following description and appended claims.

The following description is merely a preferred illustration of my invention, it being understood that various satisfactory modifications thereof may be made and will be apparent from the teachings of this specification and claims.

It is well known in the floral industry that flower growers cut most of the roses and other flowers for the florist trade a short time prior to the opening of the buds or bulbs, that being in the "tight" status, as known in the trade, this because of the necessity of temporarily packing and storing the cut flowers usually in a cooling room and transporting the same substantial distances to the retail florist who again has to place the cut flowers into a refrigerator to keep and display the same in a substantially cool temperature and thereby maintain the flowers in the most desirable condition. Most of such "tight" flowers are in the form of buds which will later open after sale to the public and under desirable conditions. This customary practice is necessitated due to the fact that if only opened, full flowers were cut, many of the petals forming the flowers would decay and drop off during the period of packing, transportation, storage and display prior to their sale to the customer.

It is also well known that after cut flowers are sold by the retail florist and placed into a body of water in a suitable vessel, that relatively few buds or unopened flowers will open very shortly after being placed in fresh water, and that most of the buds, especially those which are at a stage requiring a number of days to develop and open, will not open and will not have time to develop and open during the normal short life of the cut flower when the stems thereof are in ordinary water, and those that do open, in most instances, do not develop to the point where they expand their petals to the degree where they curl the ends of the petal backward. This is because of the fact that development or "growth" of the flower, in bud form, stopped promptly on cutting and that such development and growth will not be resumed upon insertion in ordinary water. Such failure to resume development is due partly to the fact that there is no food in the water for the flower and because of the souring of the water due to bacteria fermentation of the bacteria.

For the purpose of carrying out the hereinbefore named objects, and eliminating the aforementioned objectionable factors, I make a composition or mixture of calcium hypochlorite, iron oxide, and either aluminum sulphate or soda alum, all thereof being in a dry powder form and thoroughly mixed. The proportions or relative quantities thereof which will work satisfactorily to carry out the purposes which I have named are as follows: Calcium hypochlorite, 1½ to 3 pounds; iron oxide, from ½ ounce to one pound; and either aluminum sulphate or soda alum, from 75 to 150 pounds. It is to be borne in mind that in mixing masses smaller than that specified, the proportion of the respective ingredients should be within the ranges of the relative proportions above indicated, and that a departure from the high and low quantity specified and within the respective ranges for any one of the respective ingredients should be accompanied by a substantially corresponding or proportionate reduction or increase from the high or low limits respectively of each other ingredient specified in the above illustration.

It is also important and a part of my invention and method included therein to place into the body of water simultaneously with the aforementioned chemical composition a water-soluble plant food such as sugar. The proportion of sugar which is to be used with and added simultaneously with the particular mass or mixture above specified is from 1500 to 4500 parts (pounds).

The mixture of the aforementioned ingredients in the proportions specified is placed in capsules or other suitable containers. I prefer to use a capsule as it provides a substantially moisture-proof container to maintain the full volume of hypo-chlorite so that it does not deteriorate prior to use, and also to keep the chemicals from deterioration. Only the composition formed of the three chemical ingredients above specified are placed in the capsule, and the capsule is in turn placed into a suitable paper or transparent bag into which the sugar is also inserted in the proportion of one ounce of sugar for each capsule.

While I have specified calcium hypo-chlorite, it is to be borne in mind that other chlorine compounds which liberate chlorine gas when placed in water will serve satisfactorily.

The dissolution of the calcium hypo-chlorite (or other equivalent chloride compound) liberates a limited, but ample, quantity of chlorine gas throughout the body of water to kill substantially all of the undesirable bacteria which normally in its absence causes a souring or liquor fermentation of the water and destructive oxidation, the action of said calcium hypo-chlorite thereby sterilizing the water to a degree to prevent undesirable action of the bacteria and also acting to keep the water clean and as an astringent. The simultaneous dissolution and combination of the relatively greater quantity of sugar dilutes the hypo-chlorite to a proper degree and the sugar thereby acts as a "carrier" for both the aluminum sulphate and hypo-chlorite.

The simultaneous dissolution of either aluminum sulphate or soda alum performs the function of an astringent and materially aids in keeping open and unobstructed the minute openings in the stem portion within the body of water to thereby permit free unobstructed absorption by the flower head of the water and plant food in the water, the movement of such water and plant food (sugar) carrying with it into the head the aluminum sulphate. This movement takes place through the fibrous structure of the flower stem to the flower petals and buds. The aluminum sulphate (or soda alum, or its chemical equivalent), performs the further function of imparting strength to the body and structure of the flower petals, said sulphate being gradually absorbed and drawn by the flowers from the solution.

The aluminum sulphate, by entering into and strengthening the body and structure of the individual petals makes the petals substantially harder and firmer than is the case of ordinary flowers, and particularly strengthens the short connecting rib which connects the petal to the stem from which it has grown. The performance of this function is of particular importance in that it increases the tensile strength and fibrous structure of the connecting rib of the individual petals to such an extent that the petals of flowers which have been immersed in water according to my invention for a period of four to eight days, are still difficult to pull off by hand, and when pulled off, break with a substantial snap showing that the connecting rib has not been oxidized or rotted by the room temperature. The firmness causing the snap depends on the particular variety of flower. The garden variety of flowers are not as hardy as flowers grown in greenhouses, and therefore do not have the same life as special cultured flowers.

The function which the iron oxide performs is partly that of a "quick" food, or a substantially quick-acting stimulant. Its further important function is to quicken the absorption of the plant food or sugar. The first mentioned function of the iron oxide can be best illustrated by comparison with the introduction of dextrose into the human body. The further function of the iron oxide, which is absorbed relatively quickly by the flowers from the body of water in which it has been dissolved, is that it imparts a richer than normal color to the flower petals and also aids in the strengthening of the fibrous structure of the petals and the rib portion connecting the same to the stem from which they have developed and grown. The absorption of the iron oxide also has a desirable effect upon the stem of the flowers in that it also aids and cooperates with the aluminum sulphate in strengthening the fibrous structure of the stem portions of the flower.

The principal function of the food, which must remain out of contact with the three aforementioned mixed-together chemical ingredients until poured into the body of water is to provide a food for the flower so that the flowers will resume growth and development upon insertion into the liquid solution containing the said composition. The aluminum sulphate, chloride and iron oxide help "carry" the sugar into and through the stem to the flower head, and increase the speed of such movement. The flower heads absorb and assimilate the food at a relatively fast rate of speed to cause the continual growth and development of the flower in the same manner as if the flower were still growing in the soil in which it had been prior to cutting.

I have found that this growth and development is such that it continues to go to the head of the flower and acts as a stimulant thereto and causes the flowers, both those which have opened and those undeveloped and unopened, to open and bloom. In order to properly nourish the bloom so that it will stand the temperature of a warm room or draft and give the flower a quick food and to eliminate oxidation and to eliminate the usual change of water, it is necessary that the two chemicals, namely hypochlorite and either aluminum sulphate or soda alum be used together and within the specified range of proportions in order that the coaction and cooperation which I have described take place. The soda alum referred to as an alternative or substitute for aluminum sulphate is also known as aluminum sodium sulphate. If the hypo-chlorite were omitted, excessive and destructive oxidation will take place because the surrounding air too rapidly absorbs the moisture from the flower. If the aluminum sulphate (or soda alum, or its equivalent) were eliminated, the stem in burned by overoxidation of the chloride, and if the sugar is eliminated, the flower will die within a few days because of lack of nourishment. Therefore, it is necessary that all the three ingredients are used in approximate proportions within the limits stated herein in order to substantially prolong the life of the bloom beyond normal. However, I wish to point out that use of these three ingredients, namely, hypochlorite, aluminum sulphate and sugar or their equivalents plus the iron oxide, the fourth ingredient hereinbefore described will bring an even greater improvement in the color of the bloom.

I have found by repeated experimentation that use of my composition results in the full development and blooming of all the buds of normally healthy plants, this being in contra-distinction to the usual non-opening and non-blooming of some of the "tight" buds of the average group of cut flowers. As the cutting and consequent separation of the bloom and stem from the plant results in taking away the temporary food and source of life, it is necessary that a quick food be given to the cut flower and the above ingredients accomplish this and make possible the relatively rapid introduction of a quick food. Also, when a bloom is cut from the plant and the source of food supply cut off, the decomposition starts at the bloom of the plant because of the lack of food rather than at the stem where the cut has been made. The introduction of the quick food of my invention stops such decomposition.

I wish to point out that in the practice of my invention, that splitting the stems of the cut flowers is advantageous in that it increases the absorption of the ingredients in the body of water.

It is to be understood that various changes may be made within reasonable limits in the proportions herein specified as most preferable as well as by the substitution of chemical equivalents which are known as having similar or identical characteristics or properties to those ingredients specified.

I claim as my invention:

1. In a composition adapted to be added to and dissolved in water in which cut flowers are placed for substantially prolonging the life of said cut flowers and for causing their continuous growth and development, a dry mixture consisting of calcium hypo-chlorite, aluminum sulphate and iron oxide, said mixture of said ingredients being soluble in water and adapted to sterilize the water, to act as an astringent, to strengthen the fibrous structure of the flower petals and stems, and to deter oxidation of the flower petals.

2. A composition having sterilizing, anti-oxidizing and astringent properties and adapted to be dissolved in a body of water into which the stems of cut flowers are inserted and adapted to substantially prolong the life of said flowers comprising aluminum sulphate, from 75 to 150 parts; calcium hypo-chlorite, 1.5 to 3 parts; and iron oxide, from .03 of one part to one part.

3. A water-soluble composition adapted to be added to water into which cut flowers are to be inserted for substantially prolonging the normal life of cut flowers and for accelerating the development and growth of immature buds, comprising sugar, aluminum sulphate, calcium hypochlorite and iron oxide, said calcium hypo-chlorite acting as a sterilizing agent, said aluminum sulphate forming an astringent, and said iron oxide being quickly absorbable and adapted to stimulating the development of the flowers.

4. In a composition adapted to be added to water in which cut flowers are inserted for prolonging the life of such cut flowers, accelerating their development, and to prevent souring of the water in which they are inserted, a water-soluble mixture comprising from approximately 75 to 150 parts of sodium alum, 1½ to 3 parts of calcium hypo-chlorite, and from .03 of a part to one part of iron oxide.

5. In a composition adapted to be added to water in which cut flowers are inserted to prolong the life of such cut flowers, accelerate their growth and development, and feed same and to sterilize said water, a mixture comprising approximately from 75 to 150 parts of sulphate compound having astringent properties, from 1½ to 3 parts of the dry water-soluble hypochlorite compound having sterilizing and astringent properties, and from .03 of a part to one part of iron oxide having the properties of quickly stimulating growth and strengthening the fibrous structure of the flower.

6. A soluble product for use in prolonging the life of cut flowers and adapted to be dissolved in water comprising a mixture of aluminum sulphate, an iron oxide and calcium compound capable of liberating chlorine, adapted to produce an acid solution to cause a rapid dissolution of the iron oxide, said aluminum and chloride compounds being adapted to keep the immersed flower stems unclogged and free to permit absorbing action through said stems, and to prevent excessive oxidation of the flower petals, said iron oxide causing accelerated absorption of the flower head, all said ingredients being adapted to strengthen the fibrous structure of the flower.

7. A soluble product for use in prolonging the life of cut flowers and adapted to be dissolved in water comprising aluminum sulphate, an iron oxide and a calcium compound capable of liberating chlorine, and adapted to produce an acid solution to cause rapid dissolution of the iron oxide, said aluminum and chloride compounds being adapted to keep the immersed flower stems unclogged and free to permit absorbing action through said stems, and to prevent excessive oxidation of the flower petals, said iron oxide causing accelerated absorption of the flower bud, all said ingredients being adapted to strengthen the fibrous structure of the flower, and sugar forming a food for the flower, said sugar being adapted to dilute said aforementioned ingredients and to prevent destructive overly-rapid action thereof.

8. As a new article of manufacture, a soluble composition for feeding, stimulating, sterilizing and strengthening cut flowers comprising from 75 to 150 parts of aluminum sulphate; from one and one half to three parts of hypo-chlorite; from one to one-thirtieth of a part of an oxide of iron, and from 1500 to 4500 parts of sugar.

9. A new product for strengthening, sterilizing, and promoting the development of cut plants comprising a composition consisting of compounds of soda alum, hypo-chlorite and iron oxide in a dry state and adapted to be dissolved in water in which stems of cut flowers are immersed to sterilize said water, to prevent obstruction and clogging of the openings in the stems to permit free absorption therethrough, and to prevent excessive oxidation of the flower heads.

10. A new product for strengthening, sterilizing, feeding and promoting the development of cut plants comprising a composition consisting of sugar and of a mixture of aluminum sulphate, of hypo-chlorite and iron oxide in a dry state and adapted to be dissolved in water in which stems of cut flowers are immersed to sterilize said water, to prevent obstruction and clogging of the openings in the stems to permit free absorption therethrough, and to prevent excessive oxidation of the flower heads.

11. A new product for strengthening, sterilizing, feeding and promoting the development of cut plants comprising a composition consisting of sugar and of a mixture of hypochlorite and ether aluminum sulphate or soda alum in a dry state and adapted to be dissolved in water in which stems of cut flowers are immersed to sterilize said water, to prevent obstruction and clogging of the openings in the stems to permit free absorption therethrough, and to prevent excessive oxidation of the flower heads.

AUGUST A. MEYER.